United States Patent [19]

Weinstein et al.

[11] 3,711,969

[45] Jan. 23, 1973

[54] SHOE STIFFENER AND METHOD OF USING THE SAME

[75] Inventors: Aaron Weinstein, Marblehead; Frank Scourtas, Newbury, both of Mass.

[73] Assignee: Pacesetter Products, Inc., Salem, Mass.

[22] Filed: Dec. 18, 1970

[21] Appl. No.: 599,652

Related U.S. Application Data

[62] Division of Ser. No. 732,833, May 29, 1968.

[52] U.S. Cl. ................................. 36/68, 12/146 D
[51] Int. Cl. ..................................... A43b 13/42
[58] Field of Search..12/146 R, 146 D, 146 S; 36/76, 36/68, 69

[56] References Cited

UNITED STATES PATENTS

| 3,174,236 | 3/1965 | Field | 12/146 D |
| 3,257,743 | 6/1966 | Closson et al. | 12/146 D |
| 3,590,411 | 7/1971 | Zemlin | 12/146 D |
| 3,602,931 | 9/1971 | MacArthur | 12/146 D |

*Primary Examiner*—Patrick D. Lawson
*Attorney*—Sewall P. Bronstein et al.

[57] ABSTRACT

A thermoplastic shoe stiffener and stiffener blank comprising a non-fabric-containing sheet of thermoplastic polyvinyl chloride having a molding temperature of between 140°F and 350°F and containing an impact modifier, preferably linear polyethylene or linear chlorinated polyethylene, in an amount between 3 and 18 percent by weight of the resin and a heat stabilizer in an amount equal to at least 1 percent by weight of the resin. The polyvinyl chloride contains a lubricant and may contain a plasticizer and filler. The stiffener is hard and tough and highly crush resistant but not brittle. It has excellent molding properties at the aforesaid temperatures, is water and mold proof, has a high flexure and tensile strength, an excellent memory for its molded shape upon deformation and an excellent recovery of its crush resistance after being crushed and then returned to its original shape. Unlike resin impregnated fabrics, strength is not affected by the direction in which it is cut and it is equally stretchable in all directions. It is coated on one side with a layer of heat activatable adhesive and on the other side with a layer of flock or a layer of heat activatable adhesive.

9 Claims, No Drawings

SHOE STIFFENER AND METHOD OF USING THE SAME

This is a division of application Ser. No. 732,833 filed by Aaron Weinstein and Frank Scourtas on May 29, 1968.

BRIEF SUMMARY OF THE INVENTION

The present invention relates to thermoplastic shoe stiffeners and shoe stiffener blanks, the term "shoe stiffener" including shoe counters, shoe toe boxes and shoe liners for maintaining the general shape of an upper made of light weight materials. Particularly, the invention relates to such thermoplastic stiffener blanks which are heated to a flaccid condition and molded to the desired shoe shape during thermal forming of the upper and while assembled with that part of the shoe upper to which they are intended to impart stiffness. Accordingly, the stiffener and upper are molded to the desired shape together in the same operation. The stiffener and upper are maintained in their desired molded shape until the stiffener cools to its normal stiff state in which it retains its molded shape.

For many years, stiffeners, such as heel counters and toe boxes were made of fibeboard, in some cases polyethylene, and were preformed. During lasting, the preformed stiffeners were assembled with and secured to the upper. In order to overcome certain disadvantages inherent with these preformed stiffeners, in more recent years, flat or slightly curved thermoplastic stiffener blanks have been heated to a moldable state and formed (molded) to the desired shape during the lasting operation and while assembled with the shoe upper, as aforesaid.

In some cases, the thermoplastic stiffener blank is covered on one side with a layer of flock and on the other side with a layer of heat activatable adhesive and the blank is stitched to the shoe upper with the flocked side facing inwardly and with the adhesive covered side lying against the upper or upper liner. The adhesive is activated at the thermal forming temperature and the activated adhesive is pressed against the shoe upper during forming to bond the stiffener to the upper.

In other cases, the blank is covered on both sides with a heat activatable adhesive and during the lasting operation it is inserted in a pocket in the upper, the inner wall of which comprises a liner. The adhesive is activated at the thermal forming temperature and the activated adhesive is pressed against the walls of the pocket during forming to bond the stiffener to the walls of the pocket.

It is essential that the thermoplastic stiffener blank be easily and highly moldable to the complex shapes required at the relatively low temperatures (140°–350 °F) used in conventional shoe forming operations (these temperatures must be low so as not to harm the shoe materials). It must also be strong, hard and stiff at normal temperatures to which the shoe may be expected to be subjected without being brittle. It must be highly resilient and resistant to crushing and have a good memory for returning to its molded shape when deformed. It must exhibit good recovery of crush resistance after it has been crushed and returned to its original molded shape. It must have a high flexure strength, a high tear resistance and a high tensile strength. Furthermore, it must be capable of being stitched to the upper without pulling away from the stitches in those cases where it is assembled with the upper by stitching.

Commercial thermoplastic stiffener blanks have heretofore been made of a fabric, such as flannel, impregnated or saturated with a thermoplastic resin, such as polyvinyl acetate, polyvinyl chloride, polyethylene, etc. Laminates of one or more plies of fabric and thermoplastic resin have been proposed. See U.S. Pat. Nos. 2,619,441; 2,684,540; 3,170,252; 3,174,236; 3,234,668 and 3,257,743.

Fabric has been and is still considered necessary in conventional thermoplastic stiffener blanks in order to reinforce and support the resin. The reasons for this are as follows: Heretofore, resins which have been proposed and which have possessed the required properties of toughness, low brittleness, high crush resistance and ductility and high moldability at the relatively low temperatures used in conventional shoe forming operations, have not been strong enough (they are too soft and tear too easily) or cohesive enough without a fabric reinforcement and support to hold them together and give them body. For example, when these resins are used without a fabric, the counter tends to pull away from the stitching securing it to the upper and the stitching tends to break the counter. However, the included fabric has the following disadvantages: (1) it decreases the moldability of the hot blanks; (2) it absorbs moisture, e.g. perspiration during use, resulting in softening and deterioration of the stiffener and the possible development of mold and odor-producing bacteria; (3) the stiffener strength varies depending on the direction in which it is cut and, accordingly, if it is cut in the wrong direction, its strength is decreased; (4) the counter is not equally stretchable in all directions which may result in breakage during molding; (5) the fabric may cause the edges of the cut counter blanks and counters to fray; (6) the crush resistance (strength) of the counter and its memory for returning to its molded shape when deformed are limited probably because the interfaces between the fabric and resin constitute weak places which are apt to crack and because the fabric itself has a poor memory and a poor crush resistance. Furthermore, impregnation of the fabric with the resin and lamination are expensive.

A non-fabric-containing thermoplastic polystyrene heel counter has been suggested in U.S. Pat. No. 3,144,670 filed Jan. 5, 1961. The fabric can be omitted from this counter because polystyrene sheets can be compounded to have sufficient stiffness and hardness to hold up without a fabric while still having molding properties which permit them to be used under conventional thermal forming conditions. However, when so compounded, they are too brittle. For example, they are too brittle to be satisfactorily stitched to the upper. Furthermore, this brittleness gives them low crush resistance and poor flexure strength. In short, although polystyrene sheets can be compounded to have those desirable properties which do not require a fabric foundation they have other properties which prevent them from making a satisfactory shoe stiffener. Accordingly, they have not met with commercial success as shoe stiffeners and thermoplastic resin impregnated fabrics are still the most widely used thermoplastic shoe stiffeners in spite of their aforesaid disadvantages.

The present invention provides an improved thermoplastic shoe stiffener having important advantages over conventional thermoplastic resin impregnated fabric stiffeners. Because it does not employ a fabric foundation it is uniformly stretchable in all directions, it can be cut in any direction and still have the same strength, it is water and moisture proof, it is highly bacteria and mold resistant, it does not fray at the edges and it has better molding properties. On the other hand, it is not brittle. It is more crush and impact resistant, has a greater recovery of crush resistance after being crushed and returned to its original shape, has a greater memory for returning to its original shape when deformed, is tougher and stronger, has a greater resistance to permanent deformation and has greater wearability, hardness and stiffness and a higher tear, flexure and tensile strength than conventional thermoplastic counters employing fabrics. Accordingly, the stiffener blank of the invention can be securely stitched to the upper without breaking and without danger of pulling away from the upper. Furthermore, the stiffener blank of the invention can be made thinner than conventional resin impregnated fabrics, which is highly desirable for certain uses.

The shoe stiffener of the present invention comprises a non-fabric-containing thermoplastic sheet of a composition consisting essentially of (1) a thermoplastic polyvinyl chloride resin of low to medium molecular weight and moldable at a temperature of between about 140° and 350°F, (2) an impact modifier for said resin and compatible with said resin and present in an amount equal to between about 3 and 18 percent, preferably between about 4 and 15 percent and more preferably between about 5 and 10 percent, by weight of the resin, and (3) a heat stabilizing compound for said resin present in an amount equal to at least 1 percent, preferably between about 1 and 7 percent and more preferably between 1 and 5 percent, by weight of the resin.

When it is stated in the specification and claims hereof that the resin sheet does not contain a fabric, e.g. "non-fabric-containing thermoplastic sheet", it is meant that it does not contain a fabric embedded therein to form a skeleton for the resin as in the case of resin impregnated fabrics. However, this terminology does not exclude laminating the polyvinyl chloride resin sheet with a fabric, (e.g. by a layer of adhesive or cement) which is not wholly embedded therein.

Preferably, one side of the sheet has a layer of dry heat activatable adhesive adhered thereto, and the other side has adhered thereto either a layer of flock or a layer of dry heat activatable adhesive.

The unique properties of the aforesaid thermoplastic polyvinyl chloride resin sheet make it possible to omit a fabric ply foundation and its aforesaid disadvantages without loss of cohesiveness and strength. Thus the resin sheet is hard and strong enough so that a reinforcing fabric is not required and yet it is not brittle but rather is quite resilient and crush resistant with an excellent memory and an excellent recovery of such memory after crushing.

These polyvinyl chloride sheets are ductile, relatively inexpensive and have a low volatility.

Homopolymers of vinyl chloride are preferred but copolymers of vinyl chloride and minor amounts, preferably between 3 and 5 percent but as high as 10 or in some cases 15 percent by weight of the total resin, of other unsaturated monomers, such as vinyl acetate, methyl methacrylate, maleic anhydride, etc. can be used, according to conventional practice in the manufacture of polyvinyl chloride copolymers. The term "polyvinyl chloride" is used herein to include both these homopolymers and these copolymers.

A preferred range of molecular weights of the polyvinyl chloride are those giving a relative viscosity ASTM D 1755–60–T test value of between about 2 and 5, preferably between about 2 and 4. These are typically low to medium molecular weight vinyl chloride polymers. When the sheet is extruded a higher molecular weight can be used as compared to when it is calendered.

Preferred impact modifiers are linear polyethylene and linear chlorinated polyethylene. However, acrylic, e.g. polymethyl methacrylate (homopolymers of methacrylate are sold under the tradename ACRYLOID by Rohm and Haas Company), ABS (acrylonitrile-butadiene-styrene), acrylonitrile-butadiene, and styrene-butadiene polymers may also be used.

Preferably the sheet is either calendered or extruded, although it may be cast, and contains a conventional lubricant, such as stearic acid, zinc, calcium or other metal stearates, paraffin wax, mineral oil, silicones, etc. present in an amount equal to between about 0.1 and 4 percent, preferably between about 0.1 and 1½ to 2 percent and more preferably between about 0.5 and 1 percent, by weight of the resin. Where the sheet is extruded a wax (0.1–4 percent by weight of the resin), is preferred but when it is calendered, stearic acid or zinc, calcium or other metal stearates (0.25–1½ percent by weight of the resin) is preferred.

The sheet may also contain a plasticizer, preferably dioctyl phthalate, for the polyvinyl chloride in an amount equal to between about 10 and 20 percent, preferably 15–20 percent, by weight of the resin and a filler, preferably calcium carbonate, in an amount equal to between about 5 and 30 percent, preferably between about 10 and 25 percent and more preferably between about 10 and 20 percent, by weight of the resin. A plasticizer and filler are preferred when the sheet is calendered but not when it is extruded.

Certain heat stabilizers, such as epoxidized compounds, e.g. oils such as soy bean oil, also function as plasticizers. Accordingly, where such heat stabilizers are used, the amount of plasticizer can be reduced by the amount of such heat stabilizer.

Where a plasticizer is used, it is preferable to use a filler to offset the softness introduced by the plasticizer. The filler does this by adding to the stiffness. The correct amount of filler and plasticizer are therefor interrelated. For example, if more plasticizer is used, more filler is required to compensate for the loss in stiffness caused by the increased amount of plasticizer. If too much filler is used, the sheet may be rendered too brittle, and if too little is used compared to the amount of plasticizer, the sheet may be too soft. However, the plasticizer and filler can both be omitted. The polyvinyl chloride sheets with plasticizer are generally not as rigid as those without plasticizer, i.e., the plasticizer makes the sheet softer. The rigidity depends on the amount of plasticizer used. The counters of the invention may be quite rigid or semi-rigid.

The addition of plasticizer also lowers the softening point of the resin sheet to thereby lower the molding temperature.

Illustrative of the conventional plasticizers which can be used are the adipates, such as dioctyl adipate, the sebacates and the azelates, epoxidized oils, the phthalates such as diphenyl phthalate, diisooctyl phthalate, diisodecyl phthalate and butyloctyl phthalate, the phosphates, such as tri(paratertiary butylphenyl) phosphate, long chain fatty acid esters, chlorinated diphenyls, camphor, pyronones, benzoyl acetone, the sulfonamides, such as ethyl o-toluene sulfonamide, etc. However, diisooctyl phthalate is by far preferred.

Illustrative of the fillers, which can be used, are the clays and silicas. However calcium carbonate is by far preferred.

Illustrative of the conventional heat stabilizers which can be used are oxirane compounds such as epoxidized soy bean oil (these have a plasticizing effect as well as a stabilizing effect), cadmium and barium fatty acid salts, i.e., the cadmium and barium soaps (e.g. stearate, octoate and oleate), cadmium and barium naphthenates, tin fatty acid salts (tin stearate, tin oleate, tin octoate, etc.), alkyl tin soaps such as dibutyl tin dilaurate, tin naphthenates, alkyl tin mercaptides, phosphite esters, polyphosphites, basic lead salts, calcium carbonate, calcium and barium soaps (e.g. stearate, octoate and oleate), calcium and barium naphthenates, etc.

When a plasticizer and filler are used and the sheet is calendered, epoxidized soy bean oil (between 2 and 7 percent by weight of the resin) is preferred as part of the plasticizer and as the heat stabilizer and when they are not used and the sheet is extruded, a tin soap stabilizer (between 1 and 5 percent, preferably 1½–2 percent, by weight of the resin) is preferred.

In addition, a pigment or pigments, may be added to the sheet for coloring.

It is pointed out that the plasticizer, the impact modifier, the vinyl acetate or other minor component of the vinyl chloride copolymer when it has such a component, and the stabilizer in some instances, e.g. epoxidized oils, all tend to increase the softness (decrease the stiffness and hardness) of the resin. Accordingly, if no plasticizer is used and the polyvinyl chloride is a homopolymer, greater amounts of impact modifier may be used. On the other hand, when a plasticizer or a vinyl acetate component is used, the amount of impact modifier may be less. It is highly preferred to keep the impact modifier below 10 percent by weight of the resin but it normally should not be reduced below 4 percent or else the resin will lose its desirable properties even with plasticizer. However, in some cases, with a plasticizer, it may be reduced to as low as 3 percent. When a plasticizer is used, the amount thereof, when added to the amount of impact modifier, and vinyl acetate component of the polyvinyl chloride resin, should not be so great as to soften the resin too much. However, it should be remembered that because the filler tends to offset the softness caused by the plasticizer, it permits the use of a greater amount than would otherwise be practical. In order to achieve adequate stiffness, the total amount of impact modifier, plasticizer (including those stabilizers such as epoxidized oils which function as plasticizers) and vinyl acetate or other minor copolymeric component of the polyvinyl chloride which tends to have a softening effect, should preferably not be more than 40 to 42 percent, more preferably not more than 32 to 35 percent, of the total weight of the vinyl chloride in the resin (exclusive of the vinyl acetate or other copolymeric minor component, if any). Still more preferably, it should not be more than 25 to 30 percent by weight of the vinyl chloride in the resin.

The polyvinyl chloride sheet without the flock and heat activatable coatings has a Tinius Olsen ASTM D 747–61–0.4 or 0.45 (40 or 45 scale reading at 60° deflection) and preferably at least 50. A Tinius Olsen stiffness of between 50 and 100 is preferred. A Tinius Olsen stiffness of between 0.63 and 0.73 (63–73 scale reading) for a 28 gauge (28 mil) sheet thickness is an adequate stiffness.

The hardness of the sheet is at least 45 or 50 and preferably at least 55 measured by the Shore D Durometer SATM D1706 test. A sheet having a Shore D test value of between 60 and 65 has proven satisfactory.

The brittleness should not be less than about 3 lbs., preferably not less than 4 or 5 lbs., measured by the Falling Dart Impact test. Preferably, it should be between 8 and 10 lbs. or more according to this test. The impact resistance of the sheet is not measurable accurately by the standard Izod test. The Falling Dart Impact test consists of clamping a sheet of standard thickness and at a standard temperature and dropping on it, from a standard height of 26 inches, a dart weighing 1½ pounds and having a hemisphere head of three-fourths inch diameter at a standard temperature with weights attached to the dart. The weights are increased until the sheet breaks.

The polyvinyl chloride sheet falls within a relatively high speed class according to the ASTM D882 tensile breaking load test, e.g. 20 inches/minute. A sheet having an ASTM D882 tensile breaking load of between 150 and 175 with an elongation of 80–100 percent at a speed of 20 inches per minute has proven quite satisfactory.

The flexural strength of the polyvinyl chloride sheet after coating with flock and heat sensitive adhesive is relatively high compared to conventional thermoplastic stiffeners, e.g. it has a flex strength according to the ASTM D1052 Ross Flex Test (complete failure with a flex cycle of 180° bend) of between 300 and 700, depending on thickness.

The dry thermoplastic heat activatable adhesive applied to one or both faces of the polyvinyl chloride sheet may be of conventional type which is compatible with polyvinyl chloride. Illustrative of such adhesives are those based on ethyl cellulose, styrene-butadiene-rubber, polyvinyl chloride resins and copolymers, butyl rubber (GR–10), GR-N butadiene-acrylonitrile rubber, vinyl acetate, ethylene vinyl acetate copolymers, polyurethanes, polyesters, polyamides, etc. Mixtures of these materials with waxy components such as paraffin wax and the higher fatty acids and their salts, e.g. stearic acid, oleic acid and their metal salts, waxy alkyd resins, etc. and/or with modifiers such as polystyrene latices and resins, ethylene-vinyl acetate copolymers, polyterpenes, other resins such as α-or B-pinene, gum rosin and gum rosin esters. The adhesive is applied as a hot melt or as an organic solution or an aqueous latex emulsion and the carrier is removed by heating so that the adhesive is adhered to the polyvinyl chloride as a dry coating.

Where a layer of flock fibers is applied to one side of the polyvinyl chloride sheet it is bonded to the sheet by means of any conventional thermoplastic adhesive compatible with the polyvinyl chloride sheet. Such adhesive may be of the same type as that applied to the adhesive side of the sheet or it may be comprised of acrylic (acrylic esters such as polymethylmethacrylate) latices, polyacrylonitrile latices, etc. A water based synthetic latex containing a surfactant, such as polyethylene oxide ester of sorbitan or mannitan, is preferred. Also, like compounds in solvent, e.g. toluene, may be used. The adhesive is applied to the polyvinyl chloride sheet as a layer in the form of a solution or emulsion. The flock is applied to the wet adhesive layer followed by evaporation of the carrier and curing of the adhesive by the application of heat.

The finished coated stiffener blanks of the invention when used for counters and toe boxes may vary in thickness between 4 and 50 mils (for counters between 18 and 50 mils and for box toes between 4 and 30 mils). The base polyvinyl chloride sheet of such blanks may vary in thickness between 4 and 40 mils. The thickness of the flock layer (flock and adhesive bonding it to the polyvinyl chloride sheet) may vary between 5–20 mils and the thickness of the heat activatable adhesive may vary between 1–10 mils.

Not only are the stiffener blanks of the invention useful for counter and toe box stiffeners but they may also be used as a liner to form a shape retaining skeleton for uppers made of very thin material. When so used, they are in the form of a thin, more flexible sheet, the total thickness of which may be between 3 and 20 mils. They can be used in this way with dry heat activatable adhesive on one side and flock on the other or with heat activatable adhesive on both sides. Because of the light weight of these shoe materials, something is needed to hold the upper to the form of the shoe.

DETAILED DESCRIPTION

EXAMPLE 1

In this Example, the polyvinyl chloride sheet consisted of an extruded sheet 20–22 mils in thickness and having the following composition:
   100 parts homopolymer of a medium molecular weight unplasticized polyvinyl chloride (relative viscosity ASTM D 1755–60–T value of 3.5)
   7 parts linear polyethylene (impact modifier)
   1½ parts of tin soap (stearate) (heat stabilizer)
   ¾ part paraffin wax lubricant
This resin sheet had an average Tinius Olsen ASTM D 747–61–T test value of 60 across the lines of orientation of the sheet and 65 parallel to the lines of orientation, a Shore D Durometer ASTM D 1706 Hardness of 63, and an average ASTM D882 tensile breaking load of 161 lbs. (7,800 psi) at 20 inches per minute with an elongation of 80–100 percent.

To one side of this sheet was applied a GR-S butadiene-styrene solution in methyl ethyl ketone solvent followed by evaporation of the solvent to form a layer (about 2 mils thick) of dry heat activatable adhesive upon cooling.

To the other side of the sheet there was applied a layer of a butadiene-styrene latex to which was applied a layer of flocking material. The flock fibers adhered to the wet butadiene-styrene layer. The latex was then dried and cured by heating. This flock layer was about 12 mils thick.

The resulting sheet had a Tinius Olsen ASTM D 747–61–65 across the lines of orientation of the sheet and 68 parallel to the lines of orientation, a Shore D Durometer ASTM D 1706 hardness of 57, an average ASTM D882 tensile breaking load of 167 lbs. (5,000 psi) at 20 inches per minute with an elongation of 80–100 percent and an ASTM D 1052 Ross Flex value of 400.

The resulting sheet was cut into counter blanks, each of which was stitched in conventional manner to the back part of a shoe upper with the flocked surface facing inwardly and the adhesive surface facing the upper. These uppers were preheated in a 350°F oven with a dwell period sufficient to render the polyvinyl chloride sheet moldable and to activate the layer of heat activatable adhesive adjacent the upper. Thereafter the back parts of the uppers were formed in conventional manner on a conventional thermal back part forming machine, involving the steps of pulling the upper over the last to mold the back part of the upper to the last and wiping in the lower margin under the insole. The heated thermoplastic counter blanks molded well to the shape of the last and at the same time the heat activated adhesive layer bonded the molded counter blanks firmly to the uppers. The lower margins of the hot counter blanks were wiped in with the lower margins of the uppers. Within a minute after the wiping in step the molded counters cooled to hardness. In each case, the resulting counter was tougher and more crush resistant, and had a greater flexure strength, tear resistance and memory upon deformation than counters made in the same way from conventional resin impregnated fabric counter blanks. Furthermore, recovery of its resistance to crushing and of its memory after it was crushed and then returned to its original shape was much better. Thus, it resisted flexing more and upon flexing it returned to its original position much more readily than the resin impregnated fabric counters. Furthermore, it could be flexed many more times than the resin impregnated fabrics before its "back" was broken, i.e., before it no longer exhibited the property of returning to its original shape. Furthermore, even after its back was broken, it did not go nearly as limp as the resin impregnated fabric counters. It maintained its standup strength and stiffness much better than the resin impregnated fabrics. Furthermore, in spite of the fact that it did not contain fabric, it stitched better than the resin impregnated fabric counters. It did not pull away from the stitching.

EXAMPLE 2

Example 2 was the same as Example 1, except that the polyvinyl chloride sheet was calendered and had the following composition:
   100 parts of low to medium molecular weight polyvinyl chloride homopolymer having a molecular weight relative viscosity ASTM D 1755–60–T test value of 3.

17 parts diisooctyl phthalate (plasticizer)
15 parts calcium carbonate (filler)
3 parts epoxidized soy bean oil (heat stabilizer)
½ part calcium stearate (lubricant)
Between 4 and 5 parts of acrylonitrile-butadiene-styrene copolymer (impact modifier)

This sheet had a Falling Dart Impact Test value of between 8 and 9 lbs., a Tinius-Olsen ASTM D747-61-T test value of 82 across the lines of orientation and 92 parallel to the lines of orientation and a thickness of 28 mils. It had an ASTM D1706 Shore D value of 65 and an average ASTM D882 tensile breaking load of 160 pounds (5,670 psi) at a speed of 20 inches per minute with an elongation of 80–100 percent.

A heat activatable layer was applied to one side of this sheet and a layer of flock was applied to the other side in the same manner as Example 1 except that the heat activatable layer was applied as an aqueous butadiene-styrene latex followed by drying.

The resulting sheet had an ASTM D747-61-T Tinius Olsen value of 90 across the lines of orientation and 98 parallel to the lines of orientation, an ASTM D1706 Shore D hardness of 63, an ASTM D882 tensile breaking load of 168 pounds (4400 psi) at a speed of 20 inches per minute with an elongation of 80–100 percent and an ASTM D1052 Ross Flex value of 700.

The heel counters formed from blanks of this composite sheet in the same manner as Example 1 (except that a preheat temperature of 250°F was used because the resin had a lower softening point) compared favorably with those of Example 1. The counter of Example 2 took about 1½ minutes to cool to stiffness after the wiping-in step.

Although in the aforesaid Examples, the counter was molded on the last, it may be molded, while assembled with the upper, on a hot or cold form followed by lasting.

We claim:

1. A method of making a stiffened shoe part comprising assembling with a shoe upper, a thermoplastic stiffener blank, applying heat to said assembly to soften said blank, forming the stiffener and upper to the desired shape on a form or last and while said stiffener is hot, followed by cooling the stiffener to hardness, said blank comprising a non-fabric-containing thermoplastic sheet which is soft and moldable at elevated temperatures but hard and stiff at normal temperatures and which comprises essentially a thermoplastic polyvinyl chloride resin moldable at a temperature of between 140°–350°F, an impact modifier for increasing the impact resistance of said resin and compatible with said resin, and a heat stabilizing compound for said resin present in an amount equal to at least 1 percent by weight of the resin, at least one side of said sheet having a layer of dry heat activatable adhesive adhered thereto.

2. A method according to claim 1, said material being flock, said blank being assembled with said upper by stitching it to the upper with the flocked surface facing inwardly and with the heat sensitive adhesive facing the upper, whereby when said blank is heated and formed while assembled with said upper, said heat activatable adhesive is activated and bonds the blank to the upper.

3. A method according to claim 2, said shoe part being a heel counter and said blank being a heel counter blank.

4. A method according to claim 1, said material being a heat activatable adhesive, said blank being assembled by placing it in a pocket in the upper, whereby when said blank is heated and formed, the heat activatable adhesive on both sides of the blank are activated and bond said sides to the walls of said pocket to thereby bond the blank to the upper.

5. A method according to claim 4, said shoe part being a heel counter and said blank being a heel counter blank.

6. The assembly with a shoe upper of a stiffener blank comprising a polyvinyl chloride sheet, at least one side of which has a layer of dry heat-activatable adhesive adhered thereto, the other side of said polyvinyl chloride sheet having adhered thereto flock material and said blank being stitched to said upper with the flocked surface facing inwardly and with the layer of heat activatable adhesive located against said upper, said blank comprising a non-fabric-containing thermoplastic sheet which is soft and moldable at elevated temperatures but hard and stiff at normal temperatures and which comprises essentially a thermoplastic polyvinyl chloride resin moldable at a temperature of between 140°–350°F, an impact modifier for increasing the impact resistance of said resin and compatible with said resin, and a heat stabilizing compound for said resin present in an amount equal to at least 1 percent by weight of the resin.

7. The assembly with a shoe upper of a stiffener blank comprising a polyvinyl chloride sheet, both sides of which each have a layer of dry heat-activatable resin adhered thereto, said blank being assembled in a pocket in said upper and comprising a non-fabric-containing thermoplastic sheet which is soft and moldable at elevated temperatures but hard and stiff at normal temperatures and which comprises essentially a thermoplastic polyvinyl chloride resin moldable at a temperature of between 140°–350°F, an impact modifier for increasing the impact resistance of said resin and compatible with said resin, and a heat stabilizing compound for said resin present in an amount equal to at least 1 percent by weight of the resin.

8. A shoe heel counter formed from a shoe stiffener blank comprising a non-fabric-containing thermoplastic sheet which is soft and moldable at elevated temperatures but hard and stiff at normal temperatures and which comprises essentially a thermoplastic polyvinyl chloride resin moldable at a temperature of between 140°–350°F, an impact modifier for increasing the impact resistance of said resin and compatible with said resin, and a heat stabilizing compound for said resin present in an amount equal to at least 1 percent by weight of the resin, at least one side of said sheet having a layer of dry heat activatable adhesive adhered thereto.

9. A shoe toe box formed from a shoe stiffener blank comprising a non-fabric containing thermoplastic sheet which is soft and moldable at elevated temperatures but hard and stiff at normal temperatures and which comprises essentially a thermoplastic polyvinyl chloride resin moldable at a temperature of between 140°–350°F, an impact modifier for increasing the impact resistance of said resin and compatible with said resin, and a heat stabilizing compound for said resin present in an amount equal to at least 1 percent by weight of the resin, at least one side of said sheet having a layer of dry heat activatable adhesive adhered thereto.

* * * * *